US010582007B2

(12) United States Patent
Chander

(10) Patent No.: US 10,582,007 B2
(45) Date of Patent: Mar. 3, 2020

(54) GOAL-BASED SOCIAL NETWORKING TO IMPROVE USER MOTIVATION

(71) Applicant: FUJITSU LIMITED, Kawasaki-shi, Kanagawa (JP)

(72) Inventor: Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 622 days.

(21) Appl. No.: 15/089,265

(22) Filed: Apr. 1, 2016

(65) Prior Publication Data
US 2017/0289302 A1 Oct. 5, 2017

(51) Int. Cl.
*H04L 29/08* (2006.01)
*G06Q 50/00* (2012.01)
*G09B 7/02* (2006.01)
*G06K 9/00* (2006.01)
*G09B 19/00* (2006.01)
*H04W 4/21* (2018.01)

(52) U.S. Cl.
CPC ........ *H04L 67/306* (2013.01); *G06K 9/00677* (2013.01); *G06Q 50/01* (2013.01); *G09B 7/02* (2013.01); *G09B 19/00* (2013.01); *H04L 67/10* (2013.01); *G06K 9/00342* (2013.01); *H04W 4/21* (2018.02)

(58) Field of Classification Search
CPC ........ G06F 19/363; G06F 1/163; G06F 3/015; G06F 17/30; G06F 19/3406; G06F 2203/011; G06F 19/3418; H04L 67/42; H04L 67/306; G06K 9/00342; A61B 5/0024; G06Q 50/01; H04W 4/21
See application file for complete search history.

(56) References Cited

U.S. PATENT DOCUMENTS 7,967,731 B2 * 6/2011 Kil ...................... G06F 19/3481
  482/8
9,747,384 B1 * 8/2017 Rao .................... G06Q 30/0271
9,895,096 B2 * 2/2018 Nims .................... A61B 5/222
(Continued)

OTHER PUBLICATIONS

"Try the New Exercise Sharing Tool from FitBit!" https://blog.fitbit.com/try-the-new-exercise-sharing-tool-from-fitbit/, Aug. 31, 2015.
(Continued)

*Primary Examiner* — Jason D Recek
*Assistant Examiner* — Ranjan Pant
(74) *Attorney, Agent, or Firm* — Maschoff Brennan

(57) ABSTRACT

A method to create and to link user profiles in a social networking system may include dynamically determining a current progress level of a first user with respect to a goal of the first user based on data received from a sensor or user input. The method may include, in response to determining that the current progress level of the first user satisfies the threshold progress level with respect to a goal of the first user, changing a user profile of the first user to include an indication that the first user has reached an achievement level with respect to the goal of the first user. The method may include selecting the user profile of the first user of the social networking system from multiple user profiles of other users of the social networking system based on the indication and presenting the user profile to a second user.

16 Claims, 3 Drawing Sheets

(56) References Cited

U.S. PATENT DOCUMENTS

| | | | |
|---|---|---|---|
| 2009/0258710 A1* | 10/2009 | Quatrochi | A63B 24/0062 463/43 |
| 2010/0079291 A1* | 4/2010 | Kroll | G06F 19/3481 340/573.1 |
| 2010/0273610 A1* | 10/2010 | Johnson | G06F 16/284 482/9 |
| 2010/0331146 A1* | 12/2010 | Kil | G06F 19/3481 482/8 |
| 2011/0046981 A1* | 2/2011 | Metzler | G06Q 30/02 705/3 |
| 2011/0275940 A1* | 11/2011 | Nims | A61B 5/222 600/483 |
| 2013/0226674 A1* | 8/2013 | Field | G06Q 50/20 705/7.38 |
| 2013/0238979 A1* | 9/2013 | Sayers, III | G06F 17/24 715/234 |
| 2014/0085077 A1* | 3/2014 | Luna | G08B 6/00 340/539.11 |
| 2014/0266731 A1* | 9/2014 | Malhotra | G06F 1/163 340/573.1 |
| 2015/0199010 A1* | 7/2015 | Coleman | A61B 5/0006 345/156 |
| 2015/0262499 A1* | 9/2015 | Wicka | G06Q 50/22 705/14.27 |
| 2015/0334198 A1* | 11/2015 | Ribiere | G06Q 50/01 709/204 |
| 2016/0107064 A1* | 4/2016 | Hoffman | A63B 24/0084 700/91 |
| 2016/0151671 A1* | 6/2016 | Weast | G06F 19/3481 434/247 |

OTHER PUBLICATIONS

European Search Report dated Mar. 10, 2017 in application No. 17150736.1.

\* cited by examiner

300

Dynamically Determine A Current Progress Level Of A First User Of A Social Networking System With Respect To A Goal Of The First User Based On Data Received From A Sensor Associated With The First User 302

Dynamically Determine Whether The Current Progress Level Of The First User Satisfies A Threshold Progress Level With Respect To A Goal Of The First User 304

In Response To Determining That The Current Progress Level Satisfies The Threshold Progress Level With Respect To The Goal Of The First User, Change A User Profile Of The First User To Include An Indication That The First User Has Reached An Achievement Level With Respect To The Goal Of The First User 306

Select The User Profile Of The First User Of The Social Networking System From A Plurality Of User Profiles Of Other Users Of The Social Networking System Based On The Indication In The User Profile Of The First User That The First User Has Reached The Achievement Level With Respect To The Goal Of The First User 308

Present The User Profile Of The First User To A Second User 310

In Response To Presentation Of The User Profile Of The First User To The Second User And Selection Of The User Profile Of The First User By The Second User, Change The User Profile Of The First User To Include A Network Link To A User Profile Of The Second User And Change The User Profile Of The Second User To Include A Network Link To The User Profile Of The First User 312

FIG. 3

GOAL-BASED SOCIAL NETWORKING TO IMPROVE USER MOTIVATION

FIELD

The embodiments discussed in the present disclosure are related to goal-based social networking to improve user motivation.

BACKGROUND

Technology may be designed to encourage attitudes or behaviors of users through, for example, persuasion or social influence. While technology may be designed to help users reach their goals, achieving goals may be difficult and many attempts to reach goals may fail.

The subject matter claimed in the present disclosure is not limited to embodiments that solve any disadvantages or that operate only in environments such as those described above. Rather, this background is only provided to illustrate one example technology area where some embodiments described may be practiced. Furthermore, unless otherwise indicated, the materials described in the background section are not prior art to the claims in the present application and are not admitted to be prior art by inclusion in this section.

SUMMARY

According to an aspect of an embodiment, a method to create and to link user profiles in a social networking system may include dynamically determining a current progress level of a first user of a social networking system with respect to a goal of the first user based on data received from a sensor or user input associated with the first user. The method may also include dynamically determining whether the current progress level of the first user satisfies a threshold progress level with respect to a goal of the user. The method may further include, in response to determining that the current progress level satisfies the threshold progress level with respect to the goal of the first user, changing a user profile of the first user to include an indication that the first user has reached an achievement level with respect to the goal of the first user. Moreover, the method may include selecting the user profile of the first user of the social networking system from multiple user profiles of other users of the social networking system based on the indication in the user profile of the first user that the first user has reached the achievement level with respect to the goal of the first user and presenting the user profile of the first user to a second user. Furthermore, the method may include, in response to presentation of the user profile of the first user to the second user and selection of the user profile of the first user by the second user, changing the user profile of the first user to include a network link to the user profile of the second user and/or changing the user profile of the second user to include a network link to the user profile of the first user.

The object and advantages of the implementations will be realized and achieved at least by the elements, features, and combinations particularly pointed out in the claims.

It is to be understood that both the foregoing general description and the following detailed description are given as examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates a flow diagram of an example method that may be implemented in the operating environment of FIG. 1.

DESCRIPTION OF EMBODIMENTS

Figure 1:
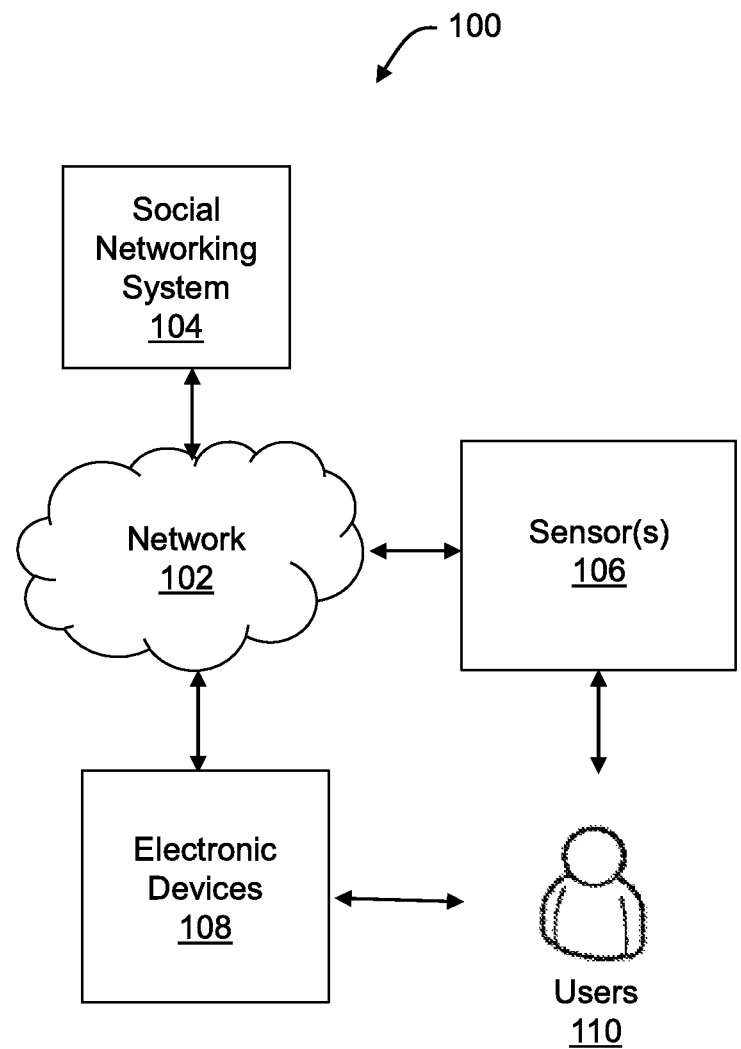
FIG. 1 is a block diagram of an example operating environment in which some embodiments may be implemented.

Some embodiments described in the present disclosure relate to a social networking system that tracks the progress of users of the social networking system towards their goals using one or more sensors and/or user input from one or more questionnaires. The social networking system may dynamically determine, based on data received from the one or more sensors and/or the user input from the one or more questionnaires, current progress levels of the users with respect to the goals of the users. The social networking system may also dynamically determine whether each of the users has satisfied a threshold progress level with respect to a goal of the corresponding user based on a progress threshold rule and the current progress level of the corresponding user with respect to the goal.

In some embodiments, the social networking system may also receive data from the one or more sensors and/or the user input from the one or more questionnaires related to a context of a goal of one or more of the users. The social networking system may dynamically determine whether the data associated with a corresponding user satisfies a threshold context level based on a context threshold rule. In response to the data associated with a particular user satisfying the threshold progress level and/or the data associated with a particular user satisfying the threshold context level, the social networking system may change the user profile of the particular user to include an indication that the particular user has reached an achievement level with respect to the goal of the particular user. For simplicity in the discussion that follows, determination of a particular achievement level may be based on one or two threshold rules. However, it is understood that a particular achievement level may be determined based on any number of threshold rules, any of which may be related to a progress level and/or a context of a goal of a particular user. The context of a goal of a particular user may include one or more conditions in which the goal may be accomplished, such as, for example, weather conditions, temperatures, etc. The context of a goal of the particular user may also include personal characteristics of the particular user related to the goal, such as, for example, an age, a mood, a health status, etc. of the particular user. The context of a goal of the particular user may include conditions in which the goal may be accomplished and/or personal characteristics of the particular user related to the goal when the particular user desires to achieve the goal.

In some embodiments, the social networking system may analyze user profiles of the users of the social networking system and may select one or more of the user profiles to present to a particular user of the social networking system to inspire or motivate the particular user to achieve the goal of the particular user. In some embodiments, the social networking system may present the particular user with a user profile of one or more other users in response to one or more of the following: determining the particular user has not reached a particular threshold progress level with respect to the goal based on a current progress level of the particular user, determining the particular user has not reached a particular achievement level with respect to the goal based on the current progress level and/or the context of the particular user, and a request by the particular user to view the one or more user profiles of the other users.

For simplicity in the discussion that follows, the discussion may refer to a first user and a second user. However, it is understood that the social networking system may include any number of users who may, for example, select user profiles of other users for emulation, form social connections, and perform the same or similar actions as described with respect to the first and second users and for whom the social networking system may track progress, dynamically determine a current progress level and/or a context of a goal, dynamically determine whether the current progress level and/or the context of the goal satisfy particular thresholds, dynamically determine an achievement level, change or update a user profile, and perform the same or similar actions as performed with respect to the first and second users.

In some embodiments, the social networking system may determine, based on data received from one or more sensors and/or user input from the one or more questionnaires, that a second user has not reached a particular achievement level and/or a particular progress level with respect to a goal of the second user. In these and other embodiments, a user profile of a first user may be selected from the user profiles of the users of the social networking system to present to the second user based on one or more of the following: 1) an indication of a progress level in the user profile of the first user; 2) an indication of an achievement level in the user profile of the first user; 3) an age of the first user being similar to an age of the second user; 4) data related to a context of a goal in which the first user reached a particular progress level and/or the achievement level with respect to the goal of the second user or a related goal, the data indicating a similarity between the context of the goal of the first user and a context of the goal of the second user; 5) a number of network links to the users of the social networking system in the user profile of the first user; 6) a number of electronic dedications in the user profile of the first user, each of the electronic dedications received from another user by the first user and indicating an intent of the other user to dedicate to the first user an action to be performed by the other user, the action being related to achievement of a goal of the first user; and 7) a number of indications in the user profile of the first user that the user profile of the first user has been selected previously by another user, among others.

In response to selection of the user profile of the first user by the social networking system and presentation of the selected user profile of the first user to the second user by the social networking system, the second user may, upon viewing the user profile of the first user, may select the user profile of the first user.

In some embodiments, the second user may select the user profile of the first user to allow the second user to emulate the first user. For example, the user profile of the first user may include an indication of a current progress level and/or an achievement level with respect to a goal of the first user, which the second user would like to also achieve. As another example, the goal of the first user may be related to the goal of the second user being the same as the goal of the second user. In some embodiments, the goal of the first user may be more difficult to achieve than the goal of the second user. In some embodiments, the goal of the first user may be related to the goal of the second user by involving a similar or same action or activity, such as, for example, walking, running, burning calories, etc.

In some embodiments, selection of the user profile of the first user may include, for example, pressing a button that indicates admiration for or a desire to emulate the first user. For example, words on the button may read "You are my hero" or "I'd like to be you when I grow up." In some embodiments, selection of the user profile of the first user by the second user may create a social connection between the first and second users by creating a network link between the user profiles of the first and second users.

For example, selection of the user profile of the first user by the second user may change the user profile of the first user to include a network link to the user profile of the second user and/or may change the user profile of the second user to include a network link to the user profile of the first user. In some embodiments, after a social connection is formed between two of the users of the social networking system, the two users may be able to send electronic dedications to each other and/or electronic gifts to each other. Each electronic dedication may indicate an intent of the sending user to dedicate to a receiving user an action to be performed by the sending user that is related to achievement of a goal of the sending and/or the receiving user. Each electronic gift may indicate an intent of the sending user to donate to the receiving user an action already performed by the sending user that is related to achievement of a goal of the sending and/or receiving user.

FIG. 1 illustrates a block diagram of an example operating environment 100 in which some embodiments may be implemented, arranged in accordance with at least one embodiment described in the present disclosure. The operating environment 100 may include a network 102, a social networking system 104, one or more sensors 106, and multiple electronic devices 108, which may be referred to as "devices 108."

In general, the network 102 may include one or more wide area networks (WANs) and/or local area networks (LANs) that enable the social networking system 104 to receive data from the one or more sensors 106 (hereinafter referred to as "sensor data") and/or user input from one or more questionnaires (hereinafter referred to as "questionnaire data") from the devices 108 or other devices. The WANs and/or the LANs may also enable the devices 108 to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

Each of the devices 108 of the social networking system 104 may be associated with or correspond to a person and/or other entity or machine that desires to achieve a goal and/or be inspired by other users to achieve the goal, such as a user 110. A particular goal may be manually input by the user 110 into the social networking system 104 and/or selected by the user 110 from one or more possible goals presented to the user 110 by the social networking system 104. Each of the users 110 may typically communicate with the network 102 using a device 108 corresponding to the corresponding user 110. The device 108 may include, but is not limited to, a desktop computer, a laptop computer, a tablet computer, a mobile phone, a smartphone, a personal digital assistant (PDA), or other suitable computing device. In some embodiments, one or more sensors 106 may be part of the device 108 and/or may communicate with the device 108. In these and other embodiments, sensor data may be received by the device 108 and sent to the social networking system 104 via the network 102.

The one or more sensors 106 may track the progress of the users 110 of the social networking system 104 with respect to the goals of the users 110. Sensor data received by the social networking system 104 may be used to determine a context of a particular user 110 and/or a current progress level with respect to a goal of the particular user 110. In the present disclosure, the term "sensor" may refer to a physical sensor that may sense or detect one or more indicators or parameters. Alternately or additionally, the term "sensor" may also refer to a system, apparatus, device, or module that may acquire information. In some embodiments, each of the sensors 106 may include one or more of the following: a location sensor, a schedule sensor, a heart rate sensor, a motion sensor, a sleep sensor, and other types of sensors. In some embodiments, the one or more sensors 106 may be included in or connected to one or more of the user devices 108. In some embodiments, the one or more sensors 106 may be wirelessly connected to one or more of the user devices 108. In some embodiments, a particular sensor 106 may be associated with a particular user 110 by sending data related to the particular user's context and/or the particular user's progress with respect to the goal of the particular user 110 to the social networking system. In some embodiments, the particular sensor 106 may be associated with the particular user 110, for example, by being included in or connected to one or more of the user devices 108 that is associated with the particular user 110.

In some embodiments, the location sensor may be configured to detect or determine a location of a particular user 110. For example, the location sensor may include a GPS receiver, a Wi-Fi signal detector, a GSM signal detector, a Bluetooth beacon detector, an Internet Protocol (IP) address detector or any other system, apparatus, device, or module that may detect or determine a location of the particular user 110.

In some embodiments, the schedule sensor may include one or more systems, apparatuses, devices, or modules configured to extract schedule data from one or more calendars associated with a particular user 110. For example, the schedule sensor may be configured to extract schedule data from the Outlook® Calendar, Google Calendar™, or other electronic calendar associated with the particular user 110. In some embodiments, in response to a particular goal relating to performing a specific action during the day or spending a specific amount of time doing an activity, data received from the schedule sensor may be used by the social networking system 104 to determine a progress level and/or achievement level of a particular user 110 with respect to the goal.

In some embodiments, the heart rate sensor may be configured to measure or determine heart rate or indicators of heart rate. For example, the heart rate sensor may include one or more sensors configured to detect a pulse, a skin temperature, etc. of a particular user 110. In these or other embodiments, the heart rate sensor may include one or more systems, apparatuses, devices, or modules configured to determine the heart rate based on the detected indicators. In some embodiments, in response to a particular goal relating to heart rate or exercise, data received from the heart rate sensor may be used by the social networking system 104 to determine a progress level and/or achievement level of a particular user 110 with respect to the goal.

In some embodiments, the motion sensor may be configured to determine or detect motion of a particular user 110. For example, in some embodiments, the motion sensor may include any suitable system, apparatus, device, or routine capable of detecting or determining one or more of the following: tilt, shake, rotation, swing, and any other motion. In these or other embodiments, the motion sensor may include one or more of the following sensors: a gyroscope, an accelerometer, a magnetometer, a pedometer, a GPS receiver, and any other sensor that may detect motion. Additionally or alternatively, the motion sensor may include one or more systems, apparatuses, devices, or modules configured to determine motion based on the information that may be detected by the motion sensor. In some embodiments, in response to a particular goal relating to motion or location, data received from the motion sensor may be used by the social networking system 104 to determine a progress level and/or achievement level of a particular user 110 with respect to the goal.

In some embodiments, the sleep sensor may be configured to determine whether a particular user 110 is sleeping and/or to detect indicators that the particular user 110 is sleeping. In some embodiments, the sleep sensor may include a physical sensor capable of detecting indicators of whether the particular user 110 is sleeping, how much the particular user 110 has slept, the sleep patterns of the particular user 110, how well the particular user 110 has slept or a quality of the sleep of the particular user 110, etc. In these or other embodiments, the sleep sensor may include one or more systems, apparatuses, devices, or modules configured to determine that the particular user 110 is sleeping based on the indicators. In some embodiments, in response to a particular goal relating to sleep, data received from the sleep sensor may be used by the social networking system 104 to determine a progress level and/or achievement level of a particular user 110 with respect to the goal.

In some embodiments, the one or more questionnaires (not illustrated in FIG. 1) may gather user input, such as, questionnaire data related to contexts of the users 110 and/or progress levels of the users 110 with respect to goals of the users 110. In these and other embodiments, the devices 108 may be used to interact with the users 110 to present the questionnaires to the users 110 and to obtain questionnaire data from the users 110. Alternately or additionally, the questionnaire data may be collected by other devices and/or people and provided to the social networking system 104. In these and other embodiments, the people may enter the questionnaire data into a digital system that may provide the questionnaire data to the social networking system 104 over the network 102. The questionnaire data may relate to, for example, one or more of the following types of data: motion data, schedule data, sleep data, location data, emotion data, and meal data. The questionnaire data may include a response of the particular user 110 to a particular questionnaire presented to the particular user 110 by the social networking system 104. The questionnaire data may be used to determine a context of a particular user 110 and/or a current progress level of a particular user 110 with respect to a goal of the particular user 110.

In some embodiments, the questionnaires may include questions related to the progress level of the particular user 110 with respect to the goal of the particular user 110 and/or the context of the particular user 110. For example, a question of "What did you have for breakfast today?" may be used to determine meal data, which may be used to determine the progress level of the particular user 110 with respect to the particular user's goal of, for example, eating more than a certain number of grams of protein each day.

In some embodiments, progress of a particular user 110 towards the goal of the particular user 110 may be determined based on sensor data and/or user input. The user input may be questionnaire data gathered by the device 108 from the user or gathered from another device and/or person. For example, the goal of the particular user 110 may include walking ten thousand (10,000) steps per day, and the sensor data and/or the questionnaire data may indicate the particular user 110 has walked five thousand (5,000) steps on a given day. In some embodiments, the progress of the particular user 110 may include a quantity or amount of the goal achieved by the particular user 110, such as, for example, five thousand (5,000) steps. In some embodiments, the progress of the particular user 110 may include a percentage of the goal achieved by the particular user. For example, based on the sensor data and/or the questionnaire data, the social networking system 104 may determine that the progress of the particular user 110 towards the goal of the particular user 110 is fifty (50) percent by dividing the number of steps walked by the particular user 110 on the given day (e.g., 5,000) by a target number of steps to walk per day (e.g., 10,000). The progress of the particular user 110 may correspond to a percentage, a quantity, or any other value indicating an amount or degree of achievement of the goal.

In some embodiments, a context of the particular user 110 may be determined based on the sensor data and/or the questionnaire data. In some embodiments, the context of the particular user 110 may relate to a difficulty of achievement of a goal of the particular user 110. For example, a goal of running a particular distance may be more easily achieved when the context includes a temperature of sixty degrees Fahrenheit (60° F.) as opposed to ninety degrees Fahrenheit (90° F.).

In general, the social networking system 104 may be configured to dynamically compute an achievement level of the particular user 110 with respect to a goal of the particular user 110 based on the sensor data and/or the questionnaire data. The achievement level of the particular user 110 with respect to the goal of the particular user may be dynamically computed based on the progress of the particular user 110 towards the goal and/or the context of the goal. In some embodiments, the social networking system 104 may compute the achievement level of the particular user 110 according to one or more threshold rules, examples of which is described in the present disclosure. Pre-defined correlations between goals and threshold rules may indicate to the social networking system 104 which threshold rules to apply. Each of the threshold rules may include a threshold progress level that the progress of the particular user 110 may satisfy and/or a threshold context level that the context of the goal may satisfy.

As an example, a first threshold rule may include a threshold progress level of four thousand (4,000) steps and a second threshold rule may include a threshold context level of a temperature below of fifty degrees Fahrenheit (50° F.). To compute the achievement level of the particular user 110 with respect to a goal of the particular user 110, the social networking system may determine to apply the first and second threshold rules based a pre-defined assignment or correlation between the goal and the first and second threshold rules. The goal of the particular user 110 may include, for example, "walk ten thousand (10,000) steps per day." In response to determining that the particular user 110 has satisfied both the first and second threshold rules by walking more than four thousand (4,000) steps in a temperature below fifty degrees Fahrenheit (50° F.), based on the sensor data and/or the questionnaire data, an achievement level of, for example, "winter walker" may be computed based on a correlation between the achievement level and satisfaction of the first and second threshold rules.

As another example, a first threshold rule may include a threshold progress level of five thousand (5,000) steps daily and a second threshold rule may include a threshold context level of an age of sixty (60) years. To compute the achievement level of the particular user 110, the social networking system may determine to apply the first and second threshold rules based on a pre-defined correlation between the goal of the particular user 110 and the first and second threshold rules. In response to determining, based on the sensor data and/or the questionnaire data, that the particular user 110 has satisfied both the first and second threshold rules by walking more than five thousand (5,000) steps daily and by being over the age of sixty (60), the social networking system may determine that the particular user 110 has reached an achievement level. In general, satisfaction of one or more progress rules associated with a particular goal may be correlated with an achievement level, which may be represented by a number, a word, or any other representation of a particular user's satisfaction of one or more threshold rules. For example, the achievement level of the particular user 110 may be determined to be "achiever" based on a pre-defined correlation between satisfaction of the one or more threshold rules and the "achiever" achievement level.

In some embodiments, one or more threshold rules may apply to all goals of a particular user 110 and/or users 110 and may not be correlated with a specific goal or goals. For example, a threshold rule may apply in response to a particular user 110 achieving a threshold of one-hundred and ten percent (110%) of any of the goals of the particular user 110. As a further illustration, in response to the particular user 110 achieving one-hundred and ten percent (110%) of a first goal of the particular user 110, the achievement level with respect to the first goal of the particular user 110 may be computed to be "Cruising," and in response to the particular user 110 achieving one-hundred and ten percent (110%) of a second goal of the particular user 110, the achievement level with respect to the second goal of the particular user 110 may be computed to be "Cruising."

In some embodiments, the achievement level of the particular user 110 with respect to the particular goal may be dynamically computed by the social networking system 104. For example, sensor data and/or questionnaire data related to the particular goal may be continuously, frequently, irregularly, or regularly received. In response to a change in the sensor data and/or the questionnaire data, the achievement level may be changed or updated, which may trigger an update of the indication of the achievement level in the user profile of the particular user 110. In response to a determination, based on one or more threshold rules, that the particular user 110 has reached the particular threshold achievement level, the social networking system 104 may also update the user profile of the particular user 110 to include an indication of the achievement level of the particular user 110 with respect to a particular goal. The indication of the achievement level of the particular user 110 with respect to the particular goal may be dynamically updated in the user profile of the particular user 110 by the social networking system 104. For example, in response to a change in the achievement level of the particular user 110 with respect to the particular goal, the indication of the achievement level may be changed or updated in the user profile of the particular user 110.

Modifications, additions, or omissions may be made to the example operating environment 100 without departing from the scope of the present disclosure. For example, in some embodiments, the example operating environment 100 may include any number of other components that may not be explicitly illustrated or described. For example, the example operating environment 100 may not include the sensors 106. As another example, the example operating environment 100 may include one or more servers, such as, for example, a location server, schedule server, or another server not illustrated, which may be used to provide sensor data to the social networking system 104.

Figure 2:
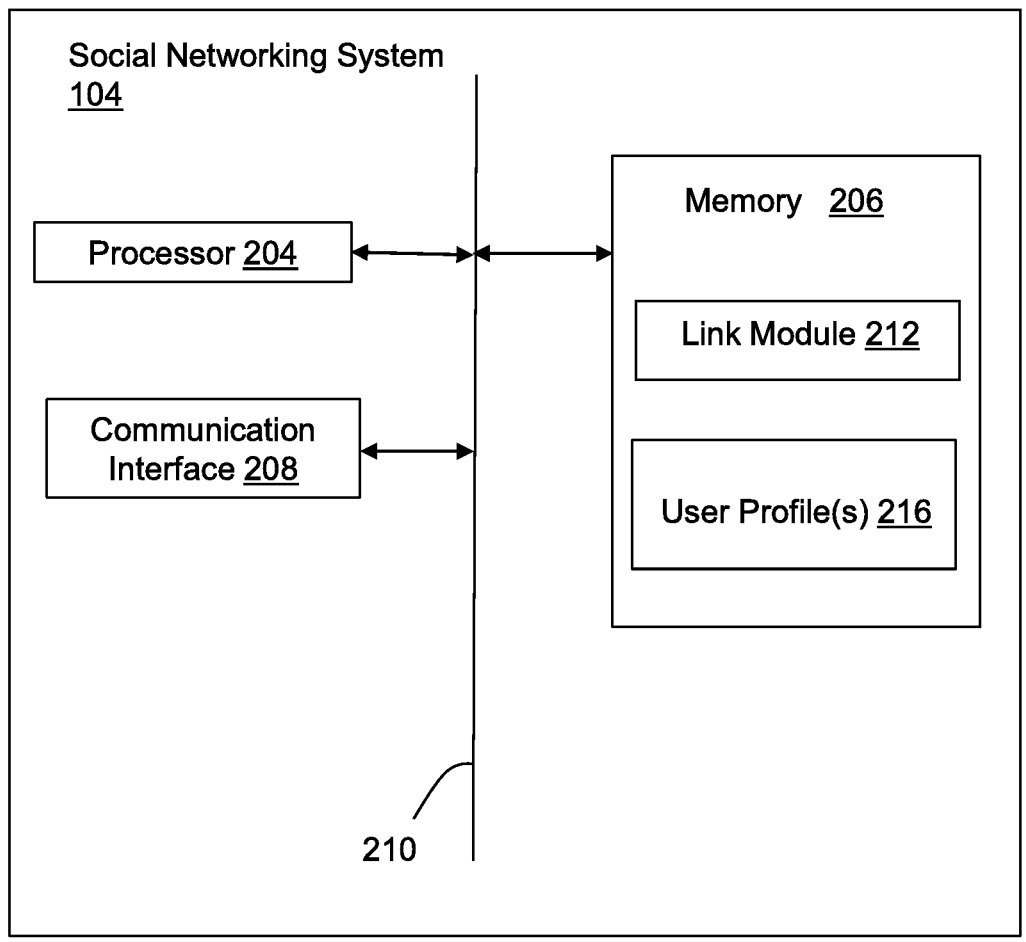
FIG. 2 is a block diagram of an example embodiment of a social networking system that may be included in the operating environment of FIG. 1.

FIG. 2 is a block diagram of an example embodiment of the social networking system 104 of FIG. 1, arranged in accordance with at least one embodiment described in the present disclosure. As illustrated, the social networking system 104 may include a processor 204, a memory 206, and a communication interface 208. The processor 204, the memory 206, and the communication interface 208 may be communicatively coupled via a communication bus 210. The communication bus 210 may include, but is not limited to, a memory bus, a storage interface bus, a bus/interface controller, an interface bus, or the like, or any combination thereof.

In general, the communication interface 208 may facilitate communications over a network, such as the network 102 of FIG. 1. The communication interface 208 may include, but is not limited to, a network interface card, a network adapter, a LAN adapter, or other suitable communication interfaces.

The processor 204 may be configured to execute computer instructions that cause the social networking system 104 to perform the functions and operations described in the present disclosure. For example, in general, the processor 204 may be configured to dynamically determine whether a current progress level of a user satisfies a threshold progress level with respect to a goal of the user. As another example, the processor 204 may be configured to select a user profile of the user from multiple user profiles of other users of the social networking system based on an indication in the user profile of the user that the user has reached the achievement level with respect to the goal of the user. The processor 204 may include, but is not limited to, a processor, a multi-core processor, a microprocessor (μP), a controller, a microcontroller (μC), a central processing unit (CPU), a digital signal processor (DSP), any combination thereof, or other suitable processor.

In some embodiments, computer instructions may be loaded into the memory 206 for execution by the processor 204 as described above. For example, the computer instructions may be in the form of one or more modules, such as, but not limited to, a link module 212. In some embodiments, data generated, received, and/or operated on during performance of the functions and operations may be at least temporarily stored in the memory 206. Moreover, the memory 206 may include volatile storage such as random access memory (RAM). More generally, the social networking system 104 may include, as the memory 206, a tangible computer-readable storage medium such as, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible computer-readable storage medium. The term computer readable medium may refer to a single medium or multiple media.

Each user of the social networking system 104 may have a user profile 216, which may be included in the memory 206. In these and other embodiments, the link module 212 may be configured to select a user profile of a first user from user profiles 216 of the users of the social networking system to present to a second user, to inspire the second user. In some embodiments, the link module 212 may be configured to determine, based on data received from one or more sensors and/or one or more questionnaires associated with the second user, that the second user has not reached a particular achievement level and/or a particular progress level with respect to a goal of the second user. In response to determining the second user has not reached the particular achievement level and/or the particular progress level with respect to the goal of the second user, the user profile of the first user and/or other user profiles may be presented to the second user.

The user profile of the first user may be selected, for example, based on an indication of a progress level of the first user in the user profile 216 of the first user and/or an indication of an achievement level of the first user in the user profile 216 of the first user. For example, based on the indication of the progress level in the user profile 216 of the first user, the link module 212 may be configured to determine that the progress level of the first user is greater than the progress level of the second user, and the user profile 216 of the first user may be selected based on the progress level of the first user being greater than the progress level of the second user. Similarly, based on the indication of the achievement level in the user profile 216 of the first user, the link module 212 may determine that the achievement level of the first user is greater than the achievement level of the second user, and the user profile 216 of the first user may be selected based on the achievement level of the first user being greater than the achievement level of the second user.

In some embodiments, the user profiles 216, including indications of achievement levels and/or progress levels of the corresponding users, may be stored in a database in the memory 206 (not illustrated in FIG. 2). Each of the user profiles 216 may also store other indications related to, for example, one or more of the following: an age of a corresponding user, a context of the corresponding user, one or more goals of the corresponding user, social connections of the corresponding user, gender of the corresponding user, professional information of the corresponding user, among other personal information of the corresponding user.

In some embodiments, the user profiles 216 may be visible and viewed by the users of the social networking system 104. In some embodiments, the link module 212 may be configured to make one or more aspects of one or more user profiles 216 visible to one or more users of the social networking system. For example, the link module 212 may be configured to make one or more indications of one or more user profiles 216 visible to one or more users of the social networking system 104. For example, an indication of an achievement level and/or a context of a particular user with respect to a goal of the particular user may be visible to users of the social networking system upon viewing a user profile 216 of the particular user. For example, in some embodiments, the indication of the achievement level may be presented to the one or more users of the social networking system in the user profile 216 as a badge, medal, trophy, etc.

In some embodiments, the link module 212 may be configured to select a user profile 216 of the first user from the user profiles 216 of the users of the social networking system to present to the second user based on an age of the first user being similar to an age of the second user. In some embodiments, a similarity between the ages of the first user and the second user may be determined based on indications in the user profiles 216 of the first and second users.

In these and other embodiments, the link module 212 may be configured to select a user profile 216 of the first user from the user profiles 216 of the users of the social networking system to present to the second user based on data related to a context of the goals of the first user being similar to a context of the goals of the second user. For example, sensor data and/or questionnaire data may indicate that the context of goal of the first user includes a temperatures of eighty degrees Fahrenheit (80° F.) and the context of the goal of the second user includes a temperature of eighty five degrees Fahrenheit (85° F.). Thus, the contexts of goals of the first and second users, such as, for example, walking a certain distance, or related goals of the first and second users may be similar. In particular, in some embodiments, the link module 212 may be configured to select the user profile 216 of the first user to present to the second user based on a context of a goal in which the first user reached the progress level and/or the achievement level based on a context of the goal of the second user being similar to the context of the goal of the first user. In some embodiments, the user profile 216 of the first user may be selected based on a context of a goal of the first user being correlated with an increased difficulty of achievement of the goal. For example, a goal of walking a certain distance may be more difficult to achieve in hot temperatures, and thus, the link module 212 may correlate a context that includes temperatures above a particular degree with increased difficulty of achievement of the goal. In some embodiments, the user profile 216 of the first user may be selected based on a context of a goal of the first user being more difficult with respect to achievement of the goal of the second user than a context of a goal of the second user. For example, the context of the first user may include a temperature of one-hundred degrees Fahrenheit (100° F.), and the context of the second user may include a temperature of seventy degrees Fahrenheit (70° F.). Thus, the context of the goal of the first user, such as, for example, walking a certain distance, may be more difficult with respect to achievement of the goal of the second user compared to the context of the second user.

In some embodiments, in response to a selection of the user profile 216 of the first user by the link module 212 and presentation of the selected user profile 216 of the first user to the second user by the link module 212, the second user may select the user profile 216 of the first user. In some embodiments, the second user may select the user profile 216 of the first user based on after viewing the user profile of the first user. Alternately or additionally, the second user may select the user profile 216 of the first user based on a desire to emulate the first user.

In some embodiments, selection of the user profile 216 of the first user by the second user may create a social connection between the first and second users. In some embodiments, a social connection between the first and second users may be automatically created by the link module 212. In these and other embodiments, the link module 212 may automatically change the user profile of the first and/or second user to create a social network link between the user profiles 216 of the first and second users. For example, selection of the user profile 216 of the first user by the second user may change the user profile 216 of the first user to include a social network link to the user profile 216 of the second user and/or may change the user profile 216 of the second user to include a social network link to the user profile 216 of the first user. In some embodiments, each social network link in a user profile 216 of a particular user may include a reference to a user profile 216 of another user. In some embodiments, in response to a first user clicking on the social network link in a user profile 216 of second user, the first user may be directed or taken to a user profile of a third user with whom the social network link is associated. In some embodiments, taking the first user to the profile of the third user may allow the first user to view the profile of the third user.

In some embodiments, the link module 212 may be configured to select the user profile 216 of the first user from the user profiles 216 of the users of the social networking system to present to the second user based on a number of social network links to the users of the social networking system 104 in the user profile 216 of the first user. The number of social network links to the users of the social networking system in the user profile 216 of the second user may indicate how often the first user has inspired other users in the past. Similarly, in some embodiments, the link module 212 may be configured to select the user profile 216 of the first user to present to the second user based on a number of indications in the user profile 216 of the first user that the user profile 216 of the first user has been selected previously by another user. For example, each time the user profile 216 of the first user is selected by a particular user of the social networking system 104, an indicator such as an inspiration badge may be awarded to the first user and presented in the user profile 216 of the first user, and the user profile 216 of the first user may be selected to present to the second user based on a total number of inspiration badges in the user profile 216 of the first user.

In some embodiments, once a social connection is formed between two users of the social networking system, the two users may be able to send electronic dedications to each other. For example, a third user of the social networking system may send an electronic dedication to the first user, the electronic dedication indicating an intent of the third user to dedicate to the first user an action to be performed by the third user that is related to achievement of a goal of the third user and/or the first user. For example, using an electronic dedication sent from the third user to the first user, the third user may dedicate his or her walk or a certain number of steps to the first user prior to performing the walk or certain number of steps. In some embodiments, the link module 212 may be configured to change the user profile 216 of the first user to include an indication of the electronic dedication. In some embodiments, the link module 212 may be configured to select the user profile 216 of the first user to present to the second user based on a number of electronic dedications in the user profile 216 of the first user. The electronic dedications may include the electronic dedication from the third user and/or one or more other users.

In some embodiments, once a social connection is formed between two users of the social networking system, the two users may be able to send electronic gifts to each other. For example, the third user of the social networking system may send an electronic gift to the first user, the electronic gift indicating an intent of the third user to dedicate to the first user an action already performed by the third user that is related to achievement of a goal of the third user and/or the first user. For example, the third user may, for example, send an electronic gift to the first user giving a certain number of steps to the first user after performing the certain number of steps. In response to the third user sending the electronic gift to the first user, the link module 212 may be configured to determine the progress level of the first user with respect to a goal of the first user, such as, for example, walking a certain number of steps per day, to be higher than a previous progress level of the first user with respect to the goal. In response to the third user sending the electronic gift to the first user, the link module 212 may also be configured to determine a progress level of the third user with respect to a goal of the third user, such as, for example, walking a certain number of steps per day, to be lower than a previous progress level of the third user with respect to the goal of the third user. In some embodiments, the goals of the first and third users may be related and concern similar activities or actions, such as, for example, walking. The achievement levels of the first user and/or the third user may also be updated based on the progress levels determined in response to sending of the electronic gift by the third user.

In some embodiments, the link module 212 may be configured to change the user profile 216 of the first user to include an indication of the electronic gift. In some embodiments, the link module 212 may be configured to select the user profile 216 of the first user to present to the second user based on a number of electronic gifts in the user profile 216 of the first user. The electronic gifts may include the electronic gift from the third user and/or one or more other users.

Modifications, additions, or omissions may be made to the social networking system 104 without departing from the scope of the present disclosure. For example, in some embodiments, the social networking system 104 may include any number of other components that may not be explicitly illustrated or described. For example, the social networking system 200 may include one or more databases, which may store various information about the users of the social networking system 200, such as, for example, sensor data and/or questionnaire data related to the users.

FIG. 3 illustrates a flow diagram of an example method 300 that may be implemented in the operating environment of FIG. 1, arranged in accordance with at least one embodiment described in the present disclosure. One or more operations associated with the method 300 may be implemented, in some embodiments, by the social networking system 104 of FIGS. 1 and 2. For example, the processor 204 of FIG. 2 may be configured to perform one or more of the operations associated with the method 300 by executing program instructions of the link module 212. Although illustrated as discrete blocks, various blocks may be divided into additional blocks, combined into fewer blocks, or eliminated, depending on the desired implementation.

The method 300 may begin at block 302, where a current progress level of a first user of a social networking system with respect to a goal of the first user may be dynamically determined based on data received from a sensor associated with the first user. In some embodiments, the social networking system may include or correspond to the social networking system 104 of FIGS. 1 and 2. Also, in some embodiments, the sensor may include or correspond to one of the sensors 106 of FIG. 1. Further, in some embodiments, the first user may include or correspond to one of the users 110 of FIG. 1. Block 302 may be followed by block 304.

At block 304, it may be dynamically determined whether the current progress level of the first user satisfies a threshold progress level with respect to a goal of the first user. Block 304 may be followed by block 306.

At block 306, in response to determining that the current progress level satisfies the threshold progress level with respect to the goal of the first user, a user profile of the first user may be changed to include an indication that the first user has reached an achievement level with respect to the goal of the first user. In some embodiments, the user profile of the first user may include or correspond to one of the user profiles 216 of FIG. 2. Block 306 may be followed by block 308.

At block 308, the user profile of the first user of the social networking system may be selected from multiple user profiles of other users of the social networking system based on the indication in the user profile of the first user that the first user has reached the achievement level with respect to the goal of the first user. In some embodiments, the user profile of the first user may be selected from multiple user profiles of other users in response to determining a current progress level of the second user with respect to a goal of the second user has not reached the threshold progress level. In some embodiments, the selection of the user profile of the first user from the multiple user profiles of the other users may be further based on one or more of the following: data related to a context in which the first user reached the achievement level, an age of the first user, among other personal or professional information about the first user that may be stored in a user profile for the first user. In some embodiments, the data may be received from a sensor associated with the first user. In some embodiments, the selection of the user profile of the first user from the multiple user profiles of the other users may be further based on a total number of network links in the user profile of the first user to the multiple user profiles of the other users. In some embodiments, the multiple user profiles of other users may include or correspond to the user profiles 216 of FIG. 2. Block 308 may be followed by block 310.

At block 310, the user profile of the first user may be presented to a second user. In some embodiments, the second user may include or correspond to one of the users 110 of FIG. 1. Block 310 may be followed by block 312.

At block 312, in response to presentation of the user profile of the first user to the second user and selection of the user profile of the first user by the second user, the user profile of the first user may be changed to include a network link to a user profile of the second user and changing a user profile of the second user to include a network link to the user profile of the first user. In some embodiments, the user profile of the second user may include or correspond to one of the user profiles 216 of FIG. 2.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, the method 300 may further include dynamically updating the user profile of the first user based on the achievement level of the first user with respect to the goal.

As another example, the method 300 may further include in response to a third user of the social networking system sending an electronic dedication to the first user, changing the user profile of the first user to include an indication of the electronic dedication. In some embodiments, the electronic dedication may indicate an intent of the third user to dedicate to the first user an action to be performed by the third user.

In some embodiments, the selection of the user profile of the first user from the multiple user profiles of the other users may be further based on the indication of the electronic dedication in the user profile of the first user.

As another example, the method 300 may further include, in response to a third user of the social networking system selecting the user profile of the first user, changing the user profile of the first user to include an indication of the selection of the user profile of the first user by the third user. The selection of the user profile of the first user from the multiple user profiles of the other users may be further based on the indication of the selection of the user profile of the first user by the third user.

As a further example, the method 300 may include, in response to a third user of the social networking system sending an electronic gift to the first user, the following: determining the progress level of the first user with respect to the goal to be higher than a previous progress level of the first user with respect to the goal; determining a progress level of the third user with respect to the goal to be lower than a previous progress level of the third user with respect to the goal; and changing the user profile of the first user to include an indication that the first user has received the electronic gift. In some embodiments, the electronic gift may indicate an intent of the third user to donate to the first user an action already performed by the third user that is related to achievement of the goal.

While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to create and to link user profiles in a system, the method comprising:

dynamically determining a current progress level of a first user of a social networking system with respect to a goal of the first user based on data received from a sensor or user input associated with the first user;

dynamically determining whether the current progress level of the first user satisfies a threshold progress level with respect to the goal of the first user;

in response to determining that the current progress level satisfies the threshold progress level with respect to the goal of the first user, changing a user profile of the first user to include an indication that the first user has reached an achievement level with respect to the goal of the first user;

in response to a second user of the social networking system sending an electronic dedication to the first user, changing the user profile of the first user to include an indication of the electronic dedication, wherein the electronic dedication indicates an intent of the second user to dedicate to the first user an action to be performed by the second user and the action is related to achievement of the goal or another goal of the second user;

selecting the user profile of the first user of the social networking system from a plurality of user profiles of other users of the social networking system based on the indication in the user profile of the first user that the first user has reached the achievement level with respect to the goal of the first user and based on a total number of electronic dedications in the user profile of the first user, each of the electronic dedications received from the other users of the social networking system;

presenting the user profile of the first user to a third user based on the selection of the user profile of the first user;

in response to presentation of the user profile of the first user to the third user and the selection of the user profile of the first user by the third user, changing the user profile of the first user to include a network link to a user profile of the third user and changing the user profile of the third user to include a network link to the user profile of the first user; and in response to a fourth user of the social networking system sending an electronic gift to the first user, the electronic gift including a numerical measure of progress toward the goal, the fourth user having completed the numerical measure of progress toward the goal:
updating the current progress level of the first user with respect to the goal to be higher than a previous progress level of the first user by the numerical measure of progress;
updating a progress level of the fourth user with respect to the goal to be lower than a previous progress level of the fourth user by the numerical measure of progress; and
changing the user profile of the first user to include an indication that the first user has received the electronic gift.

2. The method of claim 1, wherein the user profile of the first user is selected from the plurality of user profiles of other users in response to determining a current progress level of the second user with respect to a goal of the second user has not reached the threshold progress level.

3. The method of claim 1, further comprising dynamically updating the user profile of the first user based on the achievement level of the first user with respect to the goal.

4. The method of claim 1, further comprising:
in response to a fifth user of the social networking system selecting the user profile of the first user, changing the user profile of the first user to include an indication of the selection of the user profile of the first user by the fifth user,
wherein the selection of the user profile of the first user from the plurality of user profiles of the other users is further based on a total number of times the user profile of the first user has been selected previously by another user.

5. The method of claim 1, wherein the selection of the user profile of the first user from the plurality of user profiles of the other users is further based on one or more of the following: data related to a context in which the first user reached the achievement level, an age of the first user, professional information regarding the first user, and a gender of the first user.

6. The method of claim 1, wherein the selection of the user profile of the first user from the plurality of user profiles of the other users is further based on a total number of network links in the user profile of the first user to the plurality of user profiles of the other users.

7. A social networking system comprising:
a processor configured to:
dynamically determine a current progress level of a first user of the social networking system with respect to a goal of the first user based on data received from a sensor or user input associated with the first user;
dynamically determine whether the current progress level of the first user satisfies a threshold progress level with respect to the goal of the first user;
in response to determining that the current progress level satisfies the threshold progress level with respect to the goal of the first user, change a user profile of the first user to include an indication that the first user has reached an achievement level with respect to the goal of the first user;
in response to a second user of the social networking system sending an electronic dedication to the first user, change the user profile of the first user to include an indication of the electronic dedication, wherein the electronic dedication indicates an intent of the second user to dedicate to the first user an action to be performed by the second user and the action is related to achievement of the goal or another goal of the second user;
select the user profile of the first user of the social networking system from a plurality of user profiles of other users of the social networking system based on the indication in the user profile of the first user that the first user has reached the achievement level with respect to the goal of the first user and based on a total number of electronic dedications in the user profile of the first user, each of the electronic dedications received from the other users of the social networking system;
present the user profile of the first user to a third user based on the selection of the user profile of the first user; and
in response to presentation of the user profile of the first user to the third user and the selection of the user profile of the first user by the third user, change the user profile of the first user to include a network link to a user profile of the third user and change the user profile of the third user to include a network link to the user profile of the first user.

8. The social networking system of claim 7, wherein the user profile of the first user is selected from the plurality of user profiles of other users in response to determining a current progress level of the second user with respect to a goal of the second user has not reached the threshold progress level.

9. The social networking system of claim 7, wherein the processor is further configured to dynamically update the user profile of the first user based on the achievement level of the first user with respect to the goal.

10. The social networking system of claim 7, wherein the processor is further configured to:
in response to a fourth user of the social networking system selecting the user profile of the first user, change the user profile of the first user to include an indication of the selection of the user profile of the first user by the fourth user,
wherein the selection of the user profile of the first user from the plurality of user profiles of the other users is further based on a total number times the user profile of the first user has been selected previously by one or more of the other users.

11. The social networking system of claim 7, wherein the selection of the user profile of the first user from the plurality of user profiles of the other users is further based on one or more of the following: data related to a context in which the first user reached the achievement level and an age of the first user, wherein the data is received from the sensor associated with the first user.

12. The social networking system of claim 7, wherein the selection of the user profile of the first user from the plurality of user profiles of the other users is further based on a total number of network links in the user profile of the first user to the plurality of user profiles of the other users.

13. The social networking system of claim 7, wherein in response to a fourth user of the social networking system sending an electronic gift to the first user, wherein the electronic gift includes a numerical measure of progress toward the goal, the fourth user having completed the numerical measure of progress toward the goal, the processor further configured to:

updating the current progress level of the first user with respect to the goal to be higher than a previous progress level of the first user by the numerical measure of progress;

updating a progress level of the fourth user with respect to the goal to be lower than a previous progress level of the fourth user by the numerical measure of progress; and changing the user profile of the first user to include an indication that the first user has received the electronic gift.

14. One or more non-transitory computer-readable media that include instructions stored thereon that are executable by one or more processors to perform or control performance of operations, the operations comprising:

dynamically determining a current progress level of a first user of a social networking system with respect to a goal of the first user based on data received from a sensor or user input associated with the first user;

dynamically determining whether the current progress level of the first user satisfies a threshold progress level with respect to the goal of the first user;

in response to determining that the current progress level satisfies the threshold progress level with respect to the goal of the first user, changing a user profile of the first user to include an indication that the first user has reached an achievement level with respect to the goal of the first user;

in response to a second user of the social networking system sending an electronic dedication to the first user, change the user profile of the first user to include an indication of the electronic dedication, wherein the electronic dedication indicates an intent of the second user to dedicate to the first user an action to be performed by the second user and the action is related to achievement of the goal or another goal of the second user;

selecting the user profile of the first user of the social networking system from a plurality of user profiles of other users of the social networking system based on the indication in the user profile of the first user that the first user has reached the achievement level with respect to the goal of the first user and based on a total number of electronic dedications in the user profile of the first user, each of the electronic dedications received from the other users of the social networking system;

presenting the user profile of the first user to a third user based on the selecting of the user profile of the first user;

in response to presentation of the user profile of the first user to the third user and selection of the user profile of the first user by the third user, changing the user profile of the first user to include a network link to the user profile of the third user and changing the user profile of the third user to include a network link to the user profile of the first user; and in response to a fourth user of the social networking system sending an electronic gift to the first user, the electronic gift including a numerical measure of progress toward the goal, the fourth user having completed the numerical measure of progress toward the goal:

updating the current progress level of the first user with respect to the goal to be higher than a previous progress level of the first user by the numerical measure of progress;

updating a progress level of the fourth user with respect to the goal to be lower than a previous progress level of the fourth user by the numerical measure of progress; and changing the user profile of the first user to include an indication that the first user has received the electronic gift.

15. The one or more non-transitory computer-readable media of claim 14, wherein the user profile of the first user is selected from the plurality of user profiles of other users in response to determining a current progress level of the second user with respect to a goal of the second user has not reached the threshold progress level.

16. The one or more non-transitory computer-readable media of claim 14, wherein the selection of the user profile of the first user from the plurality of user profiles of the other users is further based on one or more of the following: data related to a context in which the first user reached the achievement level and an age of the first user, wherein the data is received from the sensor associated with the first user.

* * * * *